Aug. 19, 1952     M. PETROFF     2,607,890
VARIABLY SENSITIVE FREQUENCY DISCRIMINATOR
Filed March 4, 1948
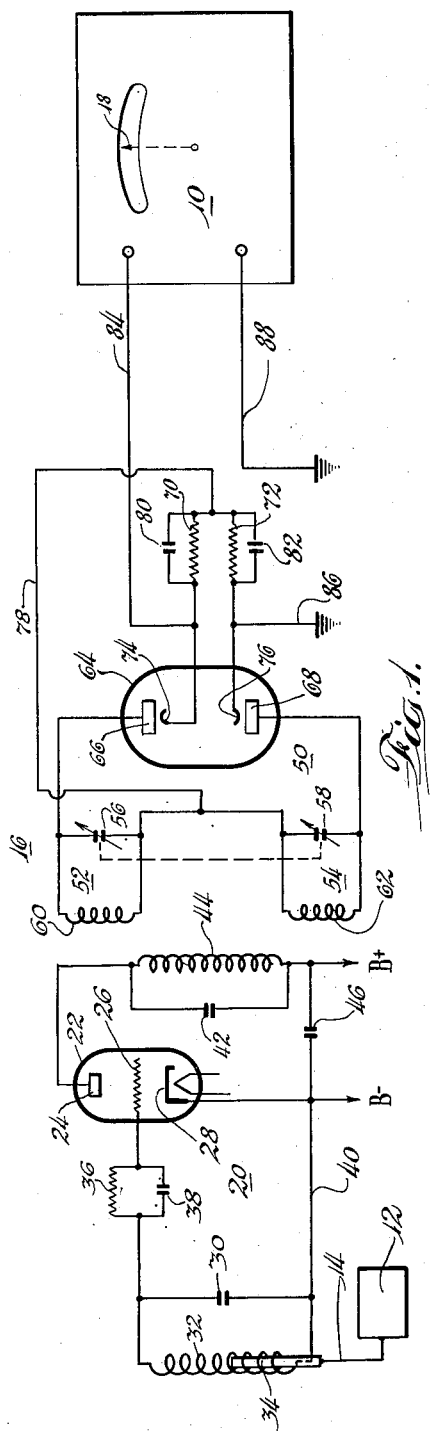
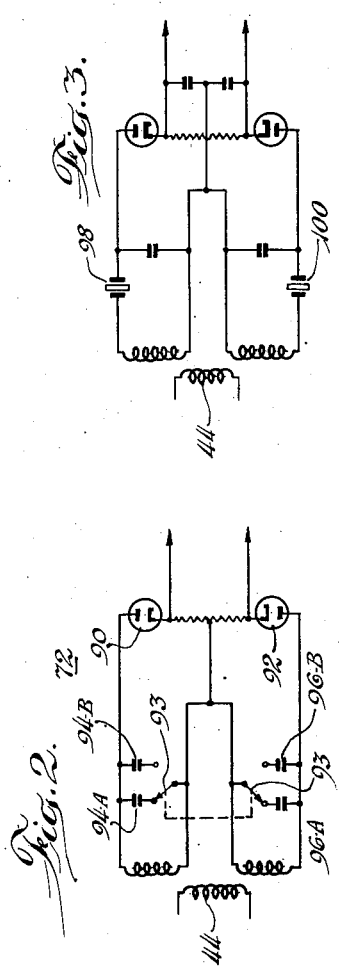
Inventor:
Merlin Petroff
By Hinkle, Horton, Ahlberg, Hansmann & Wupper
Attorneys.

Patented Aug. 19, 1952

2,607,890

UNITED STATES PATENT OFFICE 2,607,890

VARIABLY SENSITIVE FREQUENCY DISCRIMINATOR

Merlin Petroff, Lake Geneva, Wis., assignor to Stewart-Warner Corporation, Chicago, Ill., a corporation of Virginia Application March 4, 1948, Serial No. 13,035

2 Claims. (Cl. 250—27)

The present invention relates to electronic indicating and recording means, and is particularly directed to apparatus for recording displacements over a wide range, such, for example, as from a few thousandths of an inch to two inches, and which is particularly suited for curve drawing instruments.

One of the primary objects of the present invention is the provision of a new and improved frequency controlled indicating or recording apparatus.

Another object of the present invention is the provision of a new and improved adjustable sensitivity frequency controlled indicating or recording apparatus.

A further object of the present invention is the provision of a new and improved frequency controlled indicating or recording apparatus including a frequency discriminator comprising balanced adjustable detuned input circuits for adjustment of the sensitivity of the apparatus.

Other objects and advantages of the present invention will become apparent from the ensuing description of illustrative embodiments of the invention, in the course of which reference is had to the accompanying drawing, in which:

Fig. 1 is a schematic illustration of one embodiment of the invention;

Fig. 2 is a fragmentary schematic illustration of a modified portion of the embodiment of Fig. 1; and Fig. 3 is a view similar to Fig. 2, of another embodiment.

Referring now to the drawing, and first to Fig. 1, the apparatus of the present invention is illustrated as including indicating and recording means 10, providing either or both a visual indication and a permanent record of displacement, a device 12 having a movable element 14 displaced in response to a change in condition, dimension, or the like, and an electronic circuit 16 interconnecting elements 14 and 10 and translating movements of element 12 into frequency variations, changing the frequency variations into voltage changes, and transmitting the voltage changes to the indicating and recording means.

The indicating and recording means 10 may be of conventional construction, such, for example, as a standard voltage actuated chart recorder having a movable element 18 movable to different positions in response to the voltage supplied to the recorder. Its movement is recorded in known manner upon a constant speed tape or chart, thereby to provide a graph of displacement versus time.

The device 12 having the displaceable element 14, may be a device such as a penetrometer, or practically any apparatus having an element moved in response to changes in condition, displacement, or time, or it may be a gauge or the like.

The electronic circuit 16 translates the movement or positional change of element 14 into a control voltage supplied to the indicator and recorder. This is done, according to one of the features of the invention, by translating movements of element 14 into frequency variations, and then utilizing the frequency changes as a source of control voltage applied to apparatus 10.

The movable element 14 controls the frequency of an oscillation generator 20 comprising a tube 22 having a plate 24, a control electrode 26, and a cathode 28. The frequency of the oscillator is determined by a tuned input circuit comprising capacitor 30 which may be adjustable and a frequency controlling inductance comprising coil 32 and an associated core 34 connected to element 14. The core may be of the powdered iron type. The control electrode is connected to one end of the inductance and capacitor through the parallel connected resistor 36 and capacitor 38. The cathode is connected to the other end of the inductance and capacitor by conductor 40.

The plate circuit of the oscillator includes a tuned circuit with a broad selectivity characteristic, comprising adjustable capacitor 42 and coil 44, the plate supply voltage being bypassed by capacitor 46.

The output of the oscillator is supplied to a frequency discriminator 50 which, in accordance with another feature of the invention, is of the balanced detector type with detuned input circuits and in which the detuning is utilized as a sensitivity control. The input circuits 52 and 54 comprise variable capacitors 56 and 58 and coils 60 and 62, respectively, the coils being inductively coupled to oscillator coil 44. The input circuits are tuned above and below the median frequency of the oscillator.

Sensitivity is varied by variation of capacitors 56 and 58, these being simultaneously variable to vary the peak separation of the input circuits and thereby provide the desired sensitivity control.

The balanced discriminator includes also a tube 64, to the plates 66 and 68 of which circuits 52 and 54 are respectively connected, and resistors 70 and 72 connected in series to the cathodes 74 and 76 associated with plates 66 and 68, respectively, and to the junction of which the junction of the input circuits is connected by conductor 78. (The cathode heaters are not shown.) Radio frequency bypass capacitors 80 and 82 are connected across resistors 70 and 72, respectively.

Variable direct current control voltage proportional to frequency variation appears across the series connected resistors 70 and 72, and it is supplied to the indicator recorder through conductor 84 and ground connections 86 and 88.

The various circuit elements may have values and be of types indicated below:

34—1 mh.; Q 90-110
44—1 mh.; Q 30-40
60, 62—.5 mh.; Q 110-125
30, 42—200 mmf. (var.)
38—200 mmf.
46—500 mmf.
56, 58—300 mmf. (var.)
80, 82—250 mmf.
36—10,000 ohms
70, 72—25,000 ohms
30, 34—tuned to 400 kc.
42, 44—tuned to 425 kc.
52—tuned to 524 kc.⎫
54—tuned to 375 kc.⎭ or over range desired.

The apparatus of the present invention provides an accurate means for automatically drawing a curve of displacement versus time. The displacement can be that of a device such as a penetrometer or devices measuring compression or extension in various plastic materials with change in load, temperature, humidity, or other causes resulting in changes of size or length. The apparatus can also be used as a gauge and in devices such as wheel balancers. In all cases the movement of the core 34 is affected in response to the conditions, etc., which it is desired to indicate or record.

The linear movement of the core changes the frequency generated by the oscillator 20. This frequency change is translated by discriminator 50 into a variable direct current control voltage proportional to the displacement of the core. The control voltage is supplied to the recording and indicating apparatus 10 to provide an indication and record of displacement.

The detuned input circuits 52 and 54 provide an arrangement giving satisfactory readings and output control voltage. Likewise, they enable the sensitivity of the apparatus to be controlled over a considerable range.

The present apparatus can readily be constructed to indicate and record satisfactorily displacements from a few thousandths of an inch total to a total of two inches. If the displacement is approximately one inch, the coil 34 is constructed to have a length of about two inches, or twice the total displacement, since a linear frequency change in response to coil displacement takes place only over about 50% of the coil. The diameter of the coil and core can readily be determined for any particular application.

If it is desired to measure other displacements, say of about $\frac{1}{32}$ inch, the coil should be $\frac{1}{16}$ inch long. In this event, the coil should be of the pancake type so that there will be a greater inductance change for a corresponding movement of the core.

The sensitivity of the electronic circuit can be adjusted for various coils or for a single coil. Thus, with the case of the two inch coil for use with displacement of about an inch, the sensitivity of the circuit is variable to such an extent that with this one coil it is possible to draw curves of any total displacement within the range of $\frac{1}{8}$ inch to one inch. It is accordingly possible to use the same circuit with about six interchangeable coil and core combinations to obtain indications and graphs of displacements within the range of .002 inch to two inches. A considerable maximum voltage change, for example, in the region of about 60 volts, is obtainable.

The embodiment of the invention illustrated in Fig. 2 is quite similar to that of Fig. 1. The main differences are the use of two tubes 90 and 92 and a different type of sensitivity control. In this embodiment, the sensitivity is adjustable by simultaneously operable switches 93 adapted to include in the tuned input circuits selected ones of a plurality of capacitors 94A, 94B, 96A, and 96B. With the selector switch set to include capacitors 94A and 96A in circuit, the apparatus has a low sensitivity because of the higher capacity of the capacitors. Capacitors 94B and 96B are of lower capacity so that when they are in circuit the apparatus has a higher sensitivity.

Where greater sensitivity is required, quartz filters 98 and 100 can be used in the input circuits, as illustrated in Fig. 3. The filter 98 is selected so as to resonate at a frequency slightly above the median frequency of the oscillator and filter 100 is selected to resonate slightly below the median frequency.

While the invention has been described in connection with details of certain illustrative embodiments, it should be understood that these details are not intended to be limitative of the invention except in so far as set forth in the accompanying claims.

Having thus described my invention, what I claim as new and desire to secure by Letters Patent of the United States, is:

1. For use in a variable frequency measuring apparatus, frequency discriminator having variable sensitivity, comprising first and second tuned input circuits including respective first and second tuning means for varying the resonant frequencies of the circuits with respect to a median frequency, unitary manually operable sensitivity control means connected to the tuning means for concurrently varying the respective tuning means to vary their resonant frequencies in opposite directions from the median frequency, first and second rectifiers respectively connected with the input circuits, and output circuit means connecting the outputs of the rectifiers in opposition.

2. For use as a variably sensitive frequency discriminator in a measuring apparatus, the combination of first and second tuned input circuits including respective first and second variable reactive means for varying the resonant frequencies of the circuits with respect to a median frequency, manually operable unitary sensitivity control means mechanically connected to both reactive means to increase the resonant frequency of the first input circuit while decreasing the resonant frequency of the second input circuit, and vice versa, first and second rectifiers respectively connected with the input circuits, and output circuit means connecting the outputs of the rectifiers in opposition.

MERLIN PETROFF.

REFERENCES CITED

The following references are of record in the file of this patent:

UNITED STATES PATENTS

| Number | Name | Date |
|---|---|---|
| 2,200,863 | Schuck | May 14, 1940 |
| 2,264,151 | Reid | Nov. 25, 1941 |
| 2,282,910 | Thompson | May 12, 1942 |
| 2,334,704 | Hilferty | Nov. 23, 1943 |
| 2,361,625 | Hansell | Oct. 31, 1944 |
| 2,387,496 | Cornelius | Oct. 23, 1945 |
| 2,423,616 | Rath | July 8, 1947 |
| 2,441,035 | Rath | May 4, 1948 |